(12) United States Patent
Berger et al.

(10) Patent No.: US 7,361,211 B2
(45) Date of Patent: Apr. 22, 2008

(54) MOISTURE EXCHANGE MODULE HAVING A BUNDLE OF MOISTURE-PERMEABLE HOLLOW FIBRE MEMBRANES

(75) Inventors: Gerhard Berger, Ebersbach (DE);
Gert Hinsenkamp, Kirchheim (DE);
Jens Intorp, Ulm (DE); Patrick Mangold, Ulm (DE); Jochen Schaefer, Ulm (DE); Sven Schnetzler, Marburg (DE); Wolfgang Weger, Hochdorf (DE); Norbert Wiesheu, Guenzburg (DE)

(73) Assignee: Daimler AG, Stuttgart (DE)

( * ) Notice: Subject to any disclaimer, the term of this patent is extended or adjusted under 35 U.S.C. 154(b) by 532 days.

(21) Appl. No.: 11/116,741

(22) Filed: Apr. 28, 2005

(65) Prior Publication Data

US 2005/0247618 A1    Nov. 10, 2005

(30) Foreign Application Priority Data

May 4, 2004    (DE) .................. 10 2004 022 311

(51) Int. Cl.
*B01D 53/22*    (2006.01)
(52) U.S. Cl. .................. 96/8; 95/52; 96/10; 210/321.8; 210/321.89
(58) Field of Classification Search .............. 95/45, 95/52; 96/4, 8, 10; 210/321.78–321.81, 210/321.87–321.9, 500.23
See application file for complete search history.

(56) References Cited

U.S. PATENT DOCUMENTS

| | | | |
|---|---|---|---|
| 4,005,998 A | | 2/1977 | Gorman .................. 55/84 |
| 4,141,835 A | | 2/1979 | Schael et al. .............. 210/321 |
| 4,876,012 A | * | 10/1989 | Kopp et al. .................. 210/644 |
| 5,094,750 A | * | 3/1992 | Kopp et al. ............ 210/321.81 |
| 5,236,586 A | * | 8/1993 | Antoni et al. ............ 210/321.8 |
| 6,653,012 B2 | * | 11/2003 | Suzuki et al. .................. 429/39 |
| 6,669,177 B2 | | 12/2003 | Shimanuki et al. ........... 261/96 |

(Continued)

FOREIGN PATENT DOCUMENTS

DE    26 46 358 C2    5/1982

(Continued)

*Primary Examiner*—Duane Smith
*Assistant Examiner*—Robert A Clemente
(74) *Attorney, Agent, or Firm*—Davidson, Davidson & Kappel, LLC

(57) ABSTRACT

A moisture exchange module has a bundle of moisture-permeable hollow fiber membranes and at least one line element for supplying a gas stream that flows through the hollow fibers in an inner flow. The at least one line element opens out into an inflow region, which is of at least approximately the same cross section as the bundle of hollow fiber membranes. According to the present invention, the at least one line element opens out into the inflow region at an angle of from 60° to 120° with respect to the longitudinal axis of the bundle of hollow fiber membranes without the longitudinal axes of the one line element and of the bundle of hollow fiber membranes intersecting one another. An annular diverter means for diverting the gas flow are provided between the cross section of the line elements through which gas can flow and the inflow region. The diverter means are arranged in such a way that an annular gap is formed, which annular gap is connected to the at least one line element and, on its side remote from the bundle of hollow fiber membranes, is connected to the inflow region.

10 Claims, 2 Drawing Sheets

U.S. PATENT DOCUMENTS 7,014,765 B2 * 3/2006 Dannenmaier ............ 210/321.8
7,172,696 B1 * 2/2007 Martinez et al. ....... 210/321.81

FOREIGN PATENT DOCUMENTS

| DE | 31 43 533 | 6/1983 |
| --- | --- | --- |
| DE | 26 60 630 C2 | 5/1984 |
| DE | 37 33 542 | 7/1988 |
| DE | 197 14 373 C1 | 4/1998 |
| DE | 696 08 194 T2 | 12/2000 |
| DE | 102 14 078 | 10/2002 |
| EP | 0 763 384 B1 | 5/2000 |
| JP | 2002-303435 | 10/2002 |

* cited by examiner

MOISTURE EXCHANGE MODULE HAVING A BUNDLE OF MOISTURE-PERMEABLE HOLLOW FIBRE MEMBRANES

Priority is claimed to German Patent Application No. DE 10 2004 022 311.4, filed on May 4, 2004, the entire disclosure of which is incorporated by reference herein.

The present invention relates to a moisture exchange module having a bundle of moisture-permeable hollow fibre membranes. Furthermore, the present invention relates to the use of a moisture exchange module of this type.

BACKGROUND

Moisture exchange modules are described in the prior art. By way of example, JP 2002-3 03 435 shows a module in which the cross section of flow increases from the line element, which is arranged perpendicular to the module, to the cross section of that part of the bundle of hollow fibre membranes through which gas is to flow.

This gives rise to the problem that the distribution of the flow becomes very uneven over the cross section of the bundle of hollow fibres through which gas is to flow, in particular as the diameter of that part of the bundle of the hollow fibre membranes through which gas is to flow increases. A similar structure enabling medium to flow onto the entire available cross section of the bundle of hollow fibre membranes analogously to the abovementioned Japanese document would therefore be highly inefficient.

In the attempt to construct a moisture exchange module that is as compact as possible, however, it is now very important to achieve a highly uniform distribution over the cross section of the bundle of hollow fibre membranes through which gas is to flow, so that as far as possible the entire surface area of all the hollow fibre membranes can be used efficiently, and consequently a bundle of hollow fibre membranes that is as short as possible is achieved. However, this should also be associated, as before, with a compact inflow region, i.e. an inflow region of the shortest overall length possible.

Furthermore, DE 26 46 358 C2 shows, from the field of dialysis, a hollow fibre arrangement having a tangential inlet which opens out into an annular space. DE 26 60 630 C2 also shows structures of this type.

SUMMARY OF THE INVENTION

It is an object of the present invention to provide a moisture exchange module which can be realized in very compact and space-saving form.

The present invention provides a moisture exchange module having a bundle of moisture-permeable hollow fibre membranes, and having at least one line element for supplying a gas stream that flows through the hollow fibres in an inner flow, the at least one line element opening out into an inflow region, which is of at least approximately the same cross section as the bundle of hollow fibre membranes, the at least one line element opening out tangentially into the inflow region without the longitudinal axes of the at least one line element and of the bundle of hollow fibre membranes intersecting one another. The at least one line element opens out into the inflow region at an angle of from 60° to 120° with respect to the longitudinal axis of the bundle of hollow fibre membranes, in that annular diverter means for diverting the gas flow are provided between the cross section of the line elements through which gas can flow and the inflow region, and in that the diverter means are arranged in such a way that an annular gap is formed, which annular gap is connected to the at least one line element and, on its side remote from the bundle of hollow fibre membranes, is connected to the inflow region.

In this arrangement, the attachment of the line at an angle to the longitudinal axis of the bundle of hollow fibre membranes allows a very compact structure to be achieved. On account of the eccentric arrangement of the line element, furthermore, it is possible to attain a very uniform distribution of the gas stream in a region formed by diverter means. On account of the region corresponding to the actual inflow region on the side remote from the bundle of hollow fibres, it is also possible to achieve a very uniform distribution in the inflow region. This results in a very uniform flow onto all the hollow fibres of the bundle.

The structure of the moisture exchange module according to the present invention therefore allows a very compact yet nevertheless very efficient exchange of moisture. Moreover, on account of the line elements being arranged at an angle to the longitudinal axis of the bundle of hollow fibre membranes, it is possible to produce a very efficient, space-saving installation arrangement for the moisture exchange module, e.g. in a fuel cell system, on account of the line elements being accessible from the side or on account of the connections provided by these line elements.

The moisture exchange module can be used advantageously in a fuel cell system.

In this case, the moisture exchange module can be used in particular to dry and humidify process gas streams, for example to humidify the feed air for the fuel cell by means of the exhaust gas from the fuel cell. The compact and lightweight design combined, at the same time, with a very high moisture exchange rate is of crucial importance depending on the structure and use of a fuel cell system of this type, for example as a drive system in vehicles. The moisture exchange module according to the present invention satisfies these requirements and therefore represents a very good moisture exchange module for the above use.

BRIEF DESCRIPTION OF THE DRAWINGS

Further advantageous configurations of the moisture exchange module according to the present invention will emerge from the claims and from the exemplary embodiments, which are explained in more detail below with reference to the drawings, in which:

DETAILED DESCRIPTION

Figure 1:
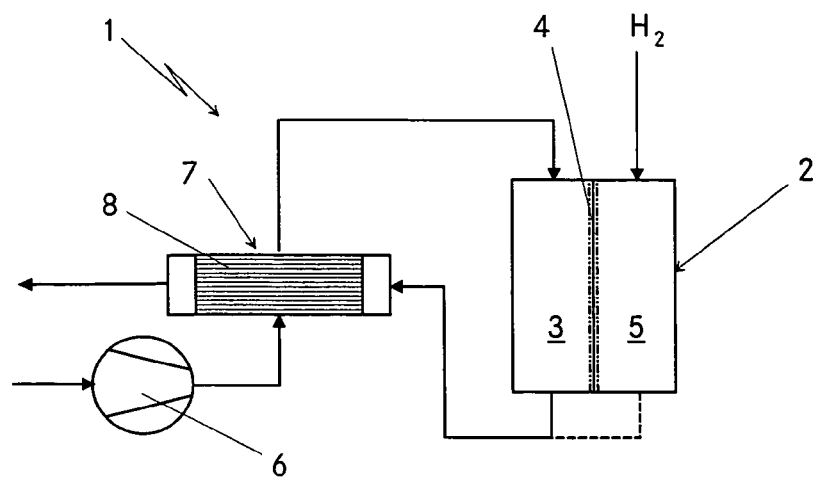
FIG. 1 shows a diagrammatically depicted fuel cell system having a moisture exchange module in accordance with the present invention.

FIG. 1 shows a very diagrammatically depicted fuel cell system 1. This system comprises a fuel cell 2, in which a cathode space 3 is separated from an anode space 5 by means of a proton-conducting membrane (proton exchange membrane, PEM) 4. The fuel cell 2 can in this case generate electrical power from hydrogen ($H_2$) in its anode space 5 and air in its cathode space 3 in a manner which is known per se. The fuel cell 2 may be constructed as a single fuel cell, or in particular as an arrangement of a large number of fuel cells, i.e. as what is known as a fuel cell stack. To protect the proton-conducting membrane 4 from drying out and thereby being damaged, the air which is fed to the cathode space 3 via a compressor 6 is humidified in a diagrammatically indicated moisture exchange module 7 by the exhaust gases flowing out of the fuel cell 2.

In the exemplary embodiment of the moisture exchange module 7 illustrated here, the moist exhaust gas from the fuel cell 2 flows through a bundle 8 of hollow fibre membranes which have the air to be humidified for the fuel cell 2 flowing around their outer surfaces. The moisture which is present in the exhaust gas is transferred through the hollow fibre membranes, which are permeable to water vapour, to the air flowing to the cathode space 3, so that this air is humidified and for its part moistens the proton-conducting membrane 4, so that the latter is protected against drying out and therefore against damage and/or premature ageing.

Since the pressure loss is higher in the hollow fibre membranes themselves than during flow around them, the arrangement of the compressor 6 illustrated here is particularly efficient, since it is in this way possible to achieve a higher internal pressure in the fuel cell 2 for the same compressor power. Therefore, on the one hand for a predetermined internal pressure the size and power of the compressor 6 and its energy consumption can be minimized, while on the other hand for a predetermined size and power of the compressor 6 the efficiency of the fuel cell 2 can be increased accordingly on account of the improved thermodynamics at a higher internal pressure.

Depending on the fuel cell system 1 used, the anode space 5 of the fuel cell 2 is supplied with hydrogen from a hydrogen store or with hydrogen which has been generated by a gas generation system, for example, from a liquid hydrocarbon. In the case of a pure hydrogen system, the anode space 5 is operated in dead-end mode or with an anode loop, whereas in the case of hydrogen generated in the gas generation system residual gases from the anode space 5 are discharged as exhaust gas. Accordingly, the moist exhaust gas used for humidification can originate either from the cathode space 3 alone or from the cathode space 3 and the anode space 5 together, as indicated in FIG. 1 by the connection in dashed lines linking the anode space 5 and the exhaust gas from the cathode space 3.

Depending on the fuel cell system 1 used, the humidified feed air may also, at least in part, be used in other ways, for example to provide at least some of the quantity of water required to generate a hydrogen-containing gas from, for example, a liquid hydrocarbon, as is carried out, for example, in DE 103 09 794.

The following statements each relate to this exemplary embodiment, presented above, of the moisture exchange module 7 in the fuel cell system 1. However, the present invention should not be restricted to applications of the moisture exchange module 7 according to the invention of this nature.

Figure 2:
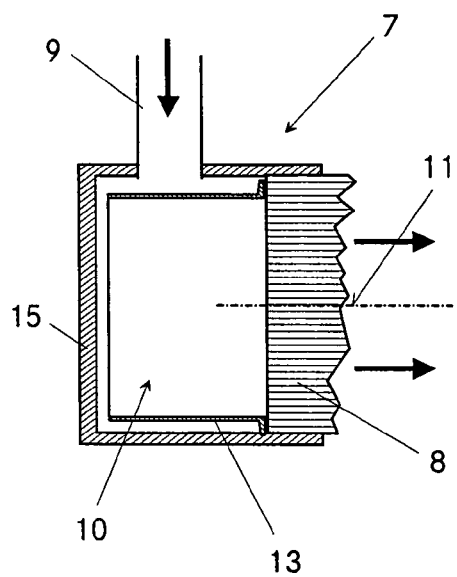
FIG. 2 shows a first embodiment of an inflow region of the moisture exchange module according to the present invention, in the form of a diagrammatic longitudinal section.

FIG. 2 illustrates part of a moisture exchange module 7. In the region illustrated, this moisture exchange module comprises part of the bundle 8 of hollow fibre membranes, a line element 9 for supplying the moist gas stream, in this case the fuel cell exhaust gas, and an inflow region 10, which is only diagrammatically indicated here (and has diverter means 13 which are explained in more detail below and are not illustrated here) and in which the gas stream is distributed before it flows through the hollow fibre membranes in the direction of a longitudinal axis 11 of the bundle 8 of hollow fibre membranes.

Arranging the line element 9—it would also be conceivable here to use a plurality of line elements 9 distributed uniformly over the circumference of the inflow region 10—at an angle of 60° to 120° with respect to the longitudinal axis 11 of the bundle 8 of hollow fibre membranes makes it possible to achieve a very short inflow region 10 in the direction of the longitudinal axis 11. This also makes it possible to realize an extraordinarily compact moisture exchange module 7. To achieve as uniform an incoming flow as possible onto the available cross section of all the hollow fibre membranes in the bundle 8, and thereby to allow the exchange surface area and therefore ultimately the length of the bundle 8 or of the entire moisture exchange module 7 to be minimized, it is necessary to achieve a good distribution of the gas stream which flows in the inflow region 10.

On account of the abovementioned arrangement of the line element 9, in this case at an angle of 90° with respect to the longitudinal axis 11 and eccentrically, i.e. such that the longitudinal axes of the respective line element 9 and of the bundle 8 of hollow fibre membranes do not intersect one another, a very uniform distribution of the incoming gas stream is achieved.

Figure 3:
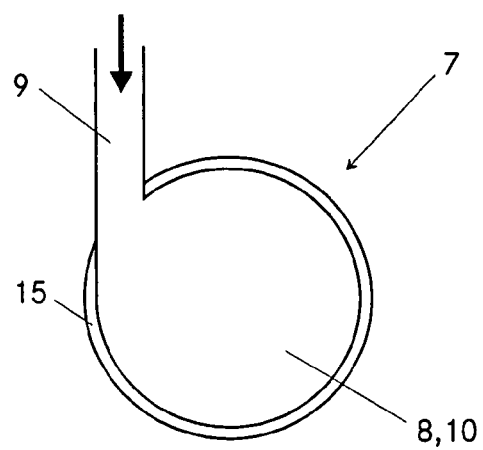
FIG. 3 shows a first embodiment of an inflow region of the moisture exchange module according to the present invention in the form of a diagrammatic cross section.

To illustrate one possible arrangement of this type for the line element 9, FIG. 3 illustrates a cross section through the inflow region 10. It can be seen from this figure that the line element 9 is arranged in such a way that its longitudinal axis is located in a plane parallel to the longitudinal axis 11 of the bundle 8 of hollow fibre membranes. This tangential linking of the line element 9, in the case illustrated here, to the inflow region 10 allows a far better and more uniform distribution of the incoming gas stream in the inflow region 10 than a central arrangement of the line element 9 would permit.

Figure 4:
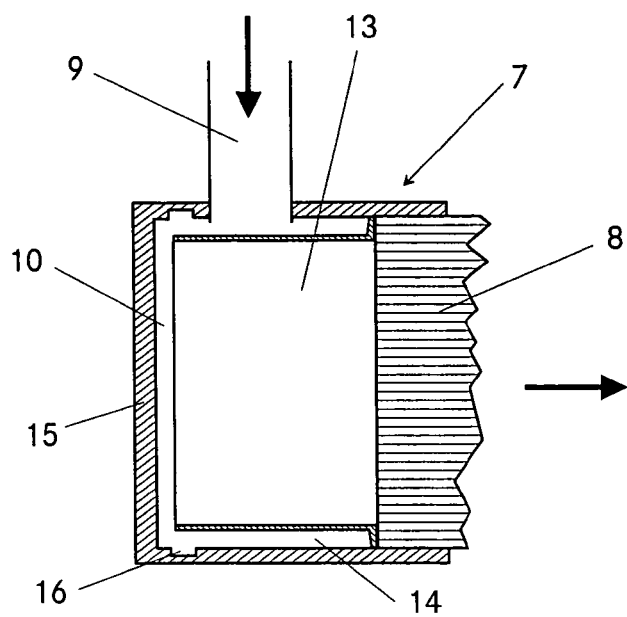
FIG. 4 shows a more detailed illustration of the inflow region of the first embodiment of the moisture exchange module according to the present invention in longitudinal section.

FIG. 4 illustrates one possible configuration of the moisture exchange module 7. To improve the as far as possible uniform distribution of the gas stream in the inflow region 10, there is a diverter means 13, which is positioned in such a way between the line element 9 and the inflow region 10 that the gas stream cannot flow directly into the inflow region 10, but rather is always first of all diverted by the diverter means 13.

An annular diverter means 13, as illustrated in FIG. 4, has proven particularly expedient for the effect of uniform distribution. The annular diverter means 13 is in this case configured in such a way that it forms an annular gap 14 between the diverter means 13 and a housing 15 of the inflow region 10. This annular gap 14 is connected to the inflow region 10 only on its side remote from the bundle 8 of hollow fibre membranes, or is open in such a manner that the gas stream can flow through here to the bundle 8 of hollow fibre membranes. This makes the tangential distribution of the gas stream flowing into the annular gap 14 even more uniform in the inflow region 10.

Furthermore, in the configuration of the moisture exchange module 7 shown in FIG. 4, there are means for separating liquid out of the gas stream. In addition to various conceivable embodiments of these means that are possible in principle, for example in the form of knitted fabrics or grids, in this case a very simple and efficient form of the means for separating out liquid has been selected here.

The means for separating out liquid in the embodiment illustrated in FIG. 4 to this end have a groove 16 which is arranged in the housing 15 of the inflow region 10. This groove 16 is arranged in a region in which the gas stream, on account of flowing in tangentially, is flowing along the housing 15 of the inflow region 10, so that liquid droplets which are present in the gas stream, on account of centrifugal force, collect in the region of the housing 15 in which the groove 16 is arranged. From the region of the groove 16, the liquid which collects can then be removed from the inflow region 10 via means which are not illustrated here, for example a valve or a run-off channel. The groove 16 or a further groove can, of course, additionally or indeed only be arranged in the region of the diverter means 13.

In principle, the means for separating liquid out of the gas stream offer the crucial advantage that liquid droplets are removed from the gas stream, so that a pure single-phase flow of gas or vapour flows through the hollow fibre membranes. A single-phase flow of this type allows a significantly lower pressure loss to be achieved in the hollow fibre membranes of the bundle 8 compared to a two-phase flow comprising gas or vapour and suspended liquid particles. Furthermore, it is also possible to prevent the possibility of small cross sections of the hollow fibre membranes becoming blocked by the liquid particles. The means for separating out liquid in this case allow the moisture exchange module 7 to be connected as illustrated without having to be correspondingly over-dimensioned with regard to the exchange capacity and size for reasons of operational reliability, minimization of pressure losses and reliability.

Figure 5:
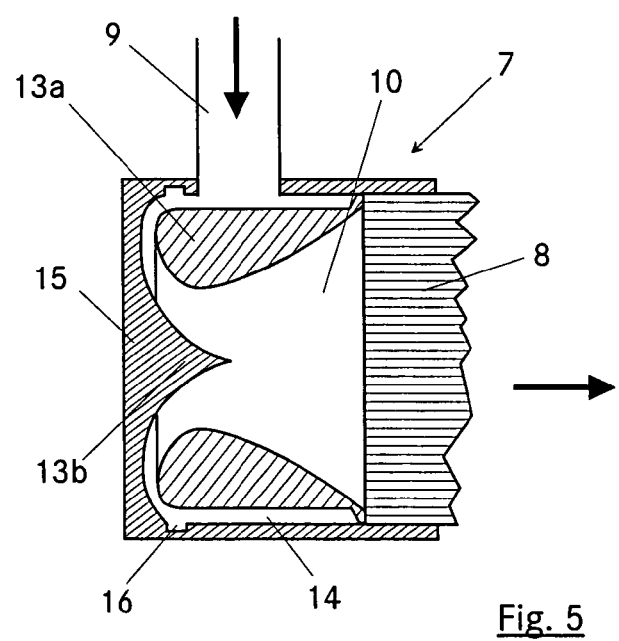
FIG. 5 shows a more detailed illustration of the inflow region of a second embodiment of the moisture exchange module according to the present invention in longitudinal section.

The embodiment of the inflow region 10 which is illustrated in FIG. 5 differs from the embodiment illustrated in FIG. 4 only in that the diverter means 13a, 13b are of somewhat different form in this case. In this case too, the diverter means comprise a substantially annular element 13a, which consists of a type of annular runner which is droplet-shaped in cross section. This annular element 13a interacts with an approximately conical bulge 13b in the housing 15, the tip of which points towards the bundle 18 of hollow fibre membranes, with its lateral surface inwardly convex.

Starting from the annular gap 14, therefore, the cross section through which the gas stream can flow increases along the diverter means 13a, 13b to form a continuous circular area. The walls of the diverter means 13a, 13b are in this case configured in such a way that the cross section through which gas can flow is continuously widened at least in that part of diverter means 13a, 13b which faces the bundle 8 of the hollow fibre membranes, so that it is possible to substantially prevent the flow from becoming detached from the diverter means 13a, 13b. This makes it possible to achieve a highly uniform distribution of the incoming gas stream over the available surface area of the bundle 8 of hollow fibre membranes. The structure shown in FIG. 5 can in principle be compared to a "folded-together" ideal diffuser.

The means for separating liquid out of the gas stream in the form of the groove 16 are likewise provided at a suitable location in the configuration shown in FIG. 5. The groove 16 or a further groove could, of course, in addition or exclusively be arranged in the region of the diverter means 13a, 13b (or 13 in the configuration shown in FIG. 5).

Figure 6:
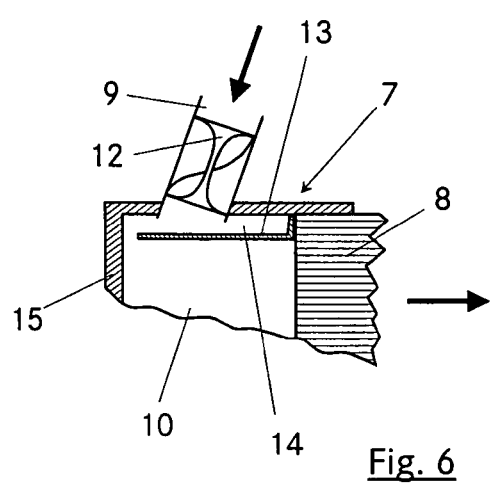
FIG. 6 shows a further possible embodiment of an inflow region of the moisture exchange module according to the present invention in the form of a diagrammatic longitudinal section.

One possible configuration of the gas supply to the inflow region is illustrated in FIG. 6. In addition to the connection of the line element 9 at an angle of approx. 70° with respect to the longitudinal axis 11 of the bundle 8 of hollow fibre membranes, in this case a means 12 for generating a swirling motion in the gas stream is additionally integrated in the line element 9. This means 12 for generating a swirling motion in the gas stream may comprise a twisted strip or if appropriate also a twisted element which is star-shaped in cross section. To produce a sufficient swirling motion in the gas stream combined with an acceptable flow resistance therein, the element or strip may be twisted through approx. 70° to 270°, in particular through half a revolution (180°). The element or strip may, for example, consist of a sheet-metal material or the like.

The combination of tangential inflow and swirling motion of the gas stream is responsible for a good distribution of the gas stream as early as in the annular gap 14 connected to the inflow region 10, so that all the hollow fibre membranes of the bundle 8 are very well utilized. The hollow fibre membranes available can be of correspondingly shorter design for the same exchange surface area used, so that overall a very small, lightweight and compact moisture exchange module 7 can be realized.

All the embodiments of the inflow region 10 of the moisture exchange module 7 illustrated here, in each case with or without the means 12 for generating a swirling motion in the gas stream, the means for separating out liquid (e.g. in the form of the groove 16) and the corresponding configurations of the diverter means 13, 13a, 13b can in each case be combined with one another in any desired way. Therefore, in accordance with the configurations of the present invention, it is readily possible to produce in each case the most favourable way of mechanically linking the line element(s) 9 combined with a distribution of the incoming gas stream which is as uniform as possible over the available surface area of the bundle 8 of hollow fibre membranes.

What is claimed is:

1. A moisture exchange module comprising:
   a bundle of moisture-permeable hollow fibre membranes having a longitudinal bundle axis;
   a gas stream flowing through the hollow fibres;
   an inflow region disposed adjacent to the bundle of hollow fibre membranes and having a cross-section approximately equal to a cross-section of the bundle of hollow fibre membranes;
   at least one line element configured to supply the gas stream and having an interior cross-section and a line axis, the at least one line element opening tangentially into the inflow region at an angle of from 60° to 120° with respect to the bundle axis so that the line axis does not intersect the bundle axis;
   an annular diverter device configured to divert a flow of the gas stream and disposed between the interior cross-section of the line element and the inflow region so as to form an annular gap, the annular gap being connected to the at least one line element and connected to the inflow region on a side of the inflow region remote from the bundle of hollow fibre membranes.

2. The moisture exchange module as recited in claim 1, the annular diverter device is formed such that a cross-section of the flow of the gas stream widens out from a first region in the annular gap to a second region in the inflow region adjacent the bundle of hollow fibre membranes, cross-section being continuous in the second region.

3. The moisture exchange module as recited in claim 2, wherein the cross-section in the second region is in the form of a circle.

4. The moisture exchange module as recited in claim 2, wherein the cross section of the flow widens out continuously at least on a side of the annular diverter device and second diverter device facing the bundle of hollow fibre membranes so that the flow does not become detached from the annular diverter device and second diverter device.

5. The moisture exchange module as recited in claim 2, wherein the annular diverter device includes an annular body and a substantially conical body disposed centrally with respect to the annular body and having a tip facing the bundle of hollow fibre membranes.

6. The moisture exchange module as recited in claim 1, further comprising a swirling device disposed at an end of the at least one line element facing the inflow region, the swirling device configured to produce a swirling motion in the flow of the gas stream.

7. The moisture exchange module as recited in claim 1, further comprising a separator device disposed upstream of the bundle of the hollow fibre membranes and configured to separate out liquid particles.

8. The moisture exchange module as recited in claim 7, wherein the separator device includes a groove in at least one of a wall of the inflow region and in the diverter device.

9. The moisture exchange module as recited in claim 1, wherein the moisture gas exchange module forms part of a fuel cell system.

10. The moisture exchange module as recited in claim 9, wherein feed air for the fuel cell system is humidified by the moisture exchange module, the feed air being delivered into the fuel cell system along an outer surface of the hollow fibre membranes using a compression device, the gas stream including a moist exhaust gas from at least one fuel cell of the fuel cell system.

* * * * *